United States Patent [19]

Seufert

[11] 4,179,252
[45] Dec. 18, 1979

[54] APPARATUS FOR FORMING FLEXIBLE FOLD LINES IN THERMOPLASTIC SHEETS AND ARTICLE SO FORMED

[76] Inventor: Gerhard Seufert, Otto-Hahn-Strasse 3, 6051 Hainhausen, Fed. Rep. of Germany

[21] Appl. No.: 830,536

[22] Filed: Sep. 6, 1977

Related U.S. Application Data

[62] Division of Ser. No. 653,053, Jan. 28, 1976, Pat. No. 4,064,206.

[30] Foreign Application Priority Data

Sep. 17, 1975 [DE] Fed. Rep. of Germany ....... 2541324

[51] Int. Cl.² .............................................. B29C 17/00
[52] U.S. Cl. ................................. 425/174.6; 425/384; 425/385
[58] Field of Search ..................... 425/174.6, 384, 385; 264/22, 25, 26, 295, 320, 322

[56] References Cited

U.S. PATENT DOCUMENTS

| | | | |
|---|---|---|---|
| 3,379,814 | 4/1968 | Bracey, Jr. | 264/322 |
| 3,454,694 | 7/1969 | Delaire et al. | 264/295 X |
| 3,518,334 | 6/1970 | Corrigan et al. | 425/384 X |
| 3,561,057 | 2/1971 | Butzko | 425/157 X |
| 3,900,550 | 8/1975 | Oliver et al. | 264/320 |
| 3,953,056 | 4/1976 | Roberts | 264/295 X |

*Primary Examiner*—Robert L. Spicer, Jr.
*Attorney, Agent, or Firm*—Seidel, Gonda, Goldhammer & Panitch

[57] ABSTRACT

An edge forming tool is pressed into a thermoplastic sheet which is supported on an anvil or counter tool. The edge forming tool is maintained at a temperature below the melting temperature of the thermoplastic sheet and a high frequency electric field is established between the edge forming tool and the counter tool. The high frequency electric field softens the thermoplastic sheet which is deformed by the edge forming tool. Thereafter, the softened and deformed portions of the thermoplastic sheet are allowed to cool and reharden before the sheet is folded to form a bend therein.

5 Claims, 4 Drawing Figures

APPARATUS FOR FORMING FLEXIBLE FOLD LINES IN THERMOPLASTIC SHEETS AND ARTICLE SO FORMED

RELATED U.S. APPLICATION

This is a divisional of application Ser. No. 653,053 filed Jan. 28, 1976, now U.S. Pat. No. 4,064,206.

BACKGROUND OF THE INVENTION

This invention relates to a process and apparatus for forming flexible fold lines in single-layer thermoplastic sheets and is particularly useful in making folded box blanks. According to the invention, surface-limited heat is applied until the sheet cross-section becomes at least partially plasticized and thereafter the sheet is deformed between an edge forming tool and a counter tool. The prepared fold lines are made in an initially mainly flat sheet and make it possible, at a later time, to bend the sheet sections adjacent the fold line to form an edge or corner. Thus, the invention does not deal with the production of a permanent bend in the material.

For a better understanding of the differences, it should be noted that the invention relates primarily to the manufacture of box blanks. At a later time, these box blanks are folded into closed hollow bodies joined together at the circumference. The boxes, however, remain flat until they are filled with goods. The boxes are usually packed in a different location than where they are produced and are therefore delivered flat in order to save space. One example of a transparent package which meets the above requirements is described in the German Registered Design No. 1,937,659.

These folded flat boxes are preferably unfolded using automatic equipment. Considerable difficulties have been experienced, however, since the boxes tend to spring back into an intermediate position between their flat position and their upright or box-shaped positions thereby creating great difficulties in packing and closing the boxes. This spring back phenomena is caused by the high elastic deformity at the fold lines or bent edges during the unfolding of the box blanks.

In an attempt to overcome this problem, it has been proposed to bend the box blanks passed their unfolded positions during the setup of the boxes so that when the boxes spring back, they will spring back into the proper position. A device capable of performing this operation is described in German patent No. 1,938,938. These devices, however, are not easily compatible with standard cardboard machines for packing and closing folded boxes. They therefore have limited use and accordingly are undesirable.

One method for producing fold lines in a thermoplastic sheet is described in German patent No. 2,236,617. According to this method, a knife edge is resistance heated to a temperature above the melting temperature of the plastic and the edge is pressed into the plastic sheet. Contrary to the explanation given in the patent, it has been found that a spring back resilience in the folded edges cannot be avoided to the degree desired. This is apparently due to the fact that the highest temperature is found along the contact surface between the knife edge and the plastic. From there, the temperature decreases towards the inside of the plastic material.

A method for bending thermoplastic sheets is also described in the book "Heat Sealing of Plastics" by W. A. Neitzert, Zechner and Heuthig Publ. GmbH, Speyer/Rhein, 1972. On pages 60 and 61 of the book, a method is described by which a heated knife is pressed into a thermoplastic sheet thereby melting the surface of the sheet. As with the previously described method, the highest temperature is found along the contact surface between the knife and sheet. According to this process, immediately after the heating knife is removed from the sheet, the sheet is bent so that the still molten surfaces contact each other and are sealed. Thus, permanent folds or bends are created by this method in contradistinction to the present invention which produces foldable or collapsible edges.

Another method for forming bends in thermoplastic sheets is described in "High-Frequency Welding" by G. F. Abele, Zechner and Heuthig Publ. GmbH, Speyer/Rhein, 1973. Pages 222–224 of this book describe a method by which a thermoplastic sheet is heated between high frequency electrodes along a fold line. An impression is then made along the fold line. However, the impression is explicitly limited to 20% of the material thickness. Furthermore, the plastic sheet is removed from the mold immediately after the high frequency heating and is immediately deformed by bending. Thus, this process produces a permanent and not easily removable bend in the thermoplastic sheet.

THE INVENTION

The present invention overcomes all of the above-described problems of the prior art and produces flexible fold lines in thermoplastic sheets which will not cause any inconvenient spring back resilience in the folded boxes during their unfolding. As a result, the flat folded boxes can be processed on standard cardboard machines without the need for any additional special equipment. The invention utilizes a fold line or edge forming tool which is kept at a temperature below the melting temperature of the thermoplastic sheet. A high frequency electric field is established between the edge forming tool and an anvil or counter tool as the edge forming tool is pressed into the thermoplastic sheet to a depth of a leat 25% of the material thickness. The thermoplastic sheet is then allowed to cool before it is bent or folded.

The temperature of the edge forming tool should be kept between 100° C. and 20° C., and preferably between 60° C. and 80° C., below the melting temperature of the thermoplastic sheet. The melting temperature of the plastic can be taken from tables and/or processing instructions of the plastic manufacturer. It is, however, also possible to perform the process of the present invention with a cold edge forming tool, i.e. the surface of the tool being kept at room temperature. For best results, the temperature of the edge forming tool should be kept above the softening temperature of the thermoplastic sheet. A temperature between the softening and melting temperatures of the plastic is most advantageous since this promotes the oscillation of the plastic molecules necessary for the development of heat. It is important that the temperature gradient not start from the surface of the edge forming tool but rather that the highest temperature be produced inside the material. This is accomplished by the use of a high frequency electric field which, in combination with the depth of impression of the edge forming tool results in a characteristic fold line cross-section which will be described in detail hereinafter.

By using a high frequency electric field for heating, the outer surface of the plastic sheet preserves its consistency. In addition, only a narrow strip of the inner part of the plastic material is melted and when the surfaces are pressed together by the edge forming tool the melted plastic moves slightly sideways forming a bulge which gives the fold line its characteristic cross section and characteristic bending behavior.

The fold lines produced according to the present invention make it possible to make box blanks which can be set up in the same manner as cardboard boxes. The box blanks do not exhibit any spring back resilience and therefore they can be processed on standard cardboard and packing machines thus making it possible to process cardboard and thermoplastic boxes alternately. This advantage is significant since it does not require large expenditures for the manufacture or purchase of new equipment.

In the preferred embodiment of the invention, the frequency of the electric field is 27.12 MHz according to the regulations of the German Federal Postal Service. It is, however, possible to increase the frequency up to 80 to 90 MHz. The higher the frequency, the faster the process. At the given frequency of 27.12 MHz, the high-frequency impression requires approximately one second and the subsequent cooling requires approximately another second. Thus, the fold lines are produced in approximately two seconds.

The method of the present invention is not limited to the preparation of folded box blanks but may also be used in the production of various other folded wrapping materials, the production of boxes with folded bottoms or tops and other similar articles. In addition, the particular plastic material is not critical as long as the necessary physical properties such as resistance to impact and a melting temperature within a practical range are met.

As indicated previously, the edge forming tool should not be permitted to be heated to the same temperature as the melting temperature of the plastic. In order to keep the desired temperature, it is particularly advantageous to cool the edge forming tool to observe the desired production condition. This, it should be pointed out, is directly contrary to the present state of the art.

It has been found to be most preferable to press the edge forming tool into the thermoplastic sheet to a depth of between 40–70% of the material thickness. A surface pressure of 3–10 kg/cm² has proven to be particularly effective. This value refers to the projection of the tool into the sheet against which the tool is pressed. Since elongated or rule-shaped tools are used, the projection of the tool is identical to the outline. It should be readily apparent that there is a direct correlation between the operating temperature and the amount of surface pressure needed to obtain a particular depth of impression: the higher the temperature, the lower the surface pressure and vice versa.

The invention is also directed toward an apparatus for implementing the method described above and includes an edge forming tool which has at least one rule-shaped tool and an anvil or counter tool. A high frequency generator produces the high frequency electric field for melting the plastic sheet. The edge forming tool is mounted on a cooling plate and the output of the high frequency generator connected to the cooling plate and the counter tool. The counter tool provides an essentially flat bearing surface for the plastic sheet. This supports the sheet both during the heating and pressing steps and while the sheet is cooling.

The apparatus of the present invention makes it possible to implement the method with the above-mentioned advantages. Preferably, the high frequency generator has an operating frequency of 27.12 MHz and which is capable of continuously producing 2500 W. With the use of such a generator, it is possible to make fold lines having a total length of approximately 6 meters or more within about one second. The edge forming tool itself is comprised of at least one rule-shaped tool having a rounded working edge and a thickness of approximately 0.6–1.0 mm. The tool is preferably made from a non-magnetic material such as brass or amagnetic steel. One or more such tools are inserted into a holding plate and are fastened in such a way that they can absorb the energy and transfer the heat produced. The holding device itself is preferably made of aluminum.

It is particularly important to have a good heat conduction between the edge forming tool and the cooling plate. The cooling plate is also preferably made of aluminum and contains tubes for a coolant such as water. By means of a regulated quantity of coolant which is preferably thermostatically controlled cooling water, it is possible to keep the cooling plate at a temperature whereby the temperature of the edge forming tool is maintained below the melting temperature of the plastic. Without such a cooling system, the temperature of the edge forming tool would eventually increase, particularly when the device is in constant operation, to a point above the melting temperature of the plastic. If this occurred, fold lines in accordance with the present invention could not be produced.

The term "cooling plate" is only relative and is used with respect to the operating temperature of the edge forming tool. In practice, the cooling plate temperature is kept at between 90°–110° C. depending on the plastic being processed. When a liquid coolant such as water is used, this is achieved by pre-heating the cooling plate at the beginning of the operation and thereafter mixing the water as it becomes heated with cold water. Thus, a heat flow is established between the edge forming tool, the cooling plate and the coolant.

In the preferred embodiment of the invention, the output of the high frequency generator is connected to the cooling plate as well as to the counter tool. This connection can also be obtained by connecting the output of the high frequency generator to parts of the device which are in electrical contact with the cooling plate and the counter tool.

It is also very important that the counter tool provide a substantially flat surface for the plastic sheets when they are cooling below the softening temperature. This feature is distinguishable from prior art devices wherein the counter tools have recesses and/or protrusions therein. In such prior art devices, the initially cold soft plastic is forced into these recesses or over the protrusions and is then heated and cooled inside the device thereby producing permanent folds and bends.

The invention also differs from other known substantially flat counter tools. These known counter tools, while they may be flat, do not serve as support surfaces for the thermoplastic sheets while they are cooling to a point below the softening temperature. On the contrary, in the prior art devices, the material must be removed therefrom as fast as possible and permanently molded in a second device.

It is also possible, with the apparatus of the present invention, to provide the cooling plate with an additional punching device for cutting out the box blanks.

Thus, it is possible to produce box blanks with the desired shape and having the desired fold lines therein in a single operation. Such blanks can then be further processed in the same way as cardboard blanks. They will, however, have all of the advantages of thermoplastic materials, such as transparency, waterproof, a pleasant appearance, etc. Furthermore, due to the high frequency electric field between the cooling plate and the counter tool, the thermoplastic sheet is also heated at the vicinity of the punching device. This facilitates the cutting operation so that very little cutting force is required. This also makes it possible to insert an insulating sheet or pad between the thermoplastic material and the counter tool which will help preserve the integrity and useful life to the counter tool.

For the purpose of illustrating the invention, there is shown in the drawings a form which is presently preferred; it being understood, however, that this invention is not limited to the precise arrangements and instrumentalities shown.

Figure 1:
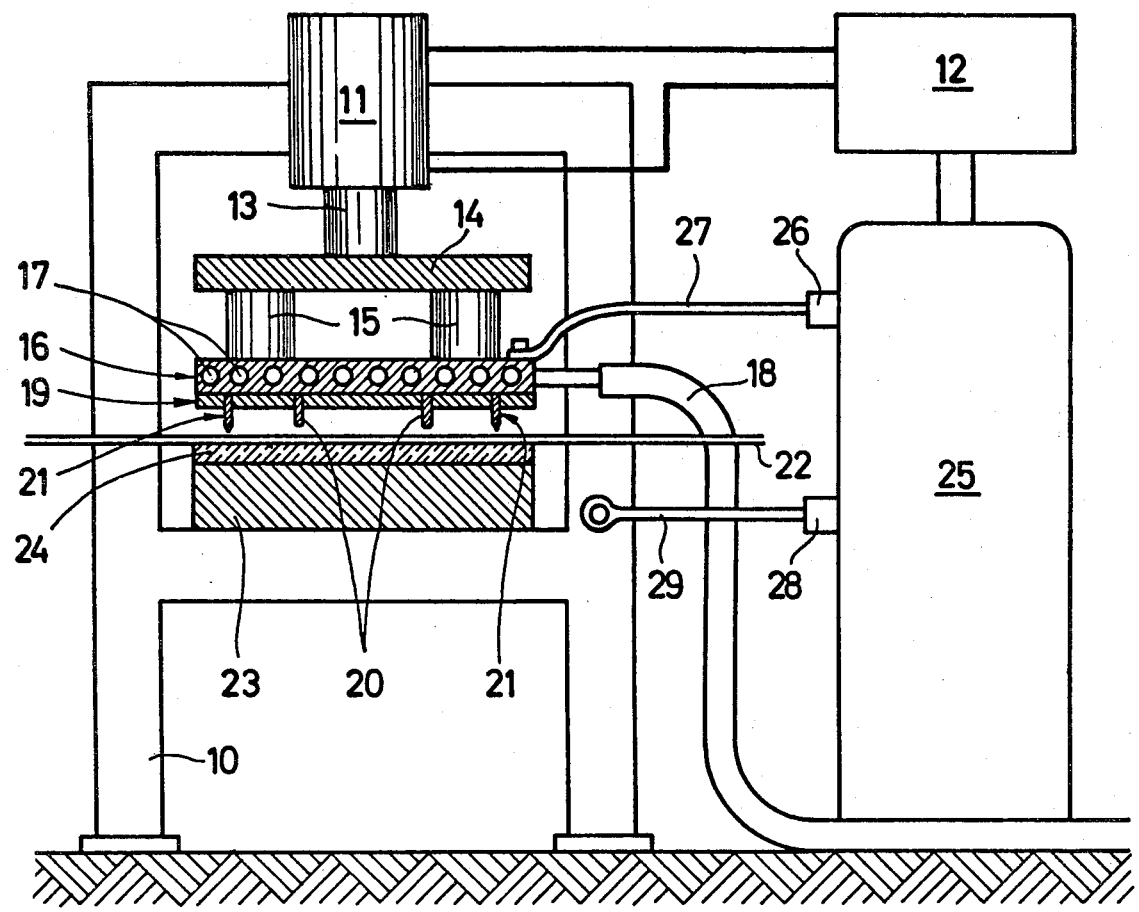
FIG. 1 is a cross sectional view of a complete apparatus constructed in accordance with the principles of the present invention.

Referring now to the drawings in detail wherein similar elements are designated by similar reference numerals throughout each of the various Figures, there is shown in FIG. 1 an apparatus constructed in accordance with the principles of the present invention. The apparatus includes a main support frame 10 having a work cylinder 11 secured at the upper part thereof. Cylinder 11 may be controlled either by a programmed control unit 12 or by hand depending on the desired operating frequency of the apparatus. Work cylinder 11 includes a piston which through piston rod 13 controls the movement of mold plate 14. A cooling plate 16 having a plurality of cooling ducts 17 therein is connected to the bottom side of the mold plate 14 through a plurality of standoff insulators 15. A coolant such as water is supplied to the cooling ducts 17 through supply tubes 18.

Connected to the bottom of cooling plate 16 is a holding plate 19 which is approximately equal in size to the cooling plate 16. Holding plate 19 carries the edge forming device which is comprised of a plurality of rule-shaped tools 20. The connection between the holding plate 19 and the cooling plate 16 is such that the upper ends of the edge forming tools 20 are in good heat transfer relationship with the cooling plate 16 and the lower ends of the edge forming tools 20 protrude below the holding plate 19.

The holding plate 19 also carries a punching or cutting device 21 in the form of a plurality of knife-shaped elements. The cutting device 21 cuts blanks out of the thermoplastic sheet 22 being processed. The thermoplastic sheet 22 can either be an individual sheet of material or may be fed from a supply roll. An anvil or counter tool 23 carrying an insulation plate 24 on the top surface thereof is located under the thermoplastic sheet 22 directly opposite the edge forming tool 20. The entire device is enclosed by a frame 10 which may be in the shape of a C-frame or any other suitable shape.

A high frequency generator 25 has a first output 26 connected to the cooling plate 16 through a conductor 27. A second output 28 of the high frequency generator 25 is connected to the frame 10 through conductor 29. Since there is an electrical connection between the frame 10 and the counter tool 23 on the first hand and between the cooling plate 16 and the edge forming tools 20 on the other hand, a high frequency electric field can be established between the edge forming tools 20 and the counter tool 23. A similar field can be established between the cutting devices 21 and the counter tool 23. Thus, the arrangement acts like a capacitor and heats the desired sections of the plastic sheet 22 by what is known in the art as dielectric heating. In order to maintain constant heating and cooling times, the high frequency 25 is also controlled by the control unit 12 in cadence with the work cylinder 11.

Figure 2:
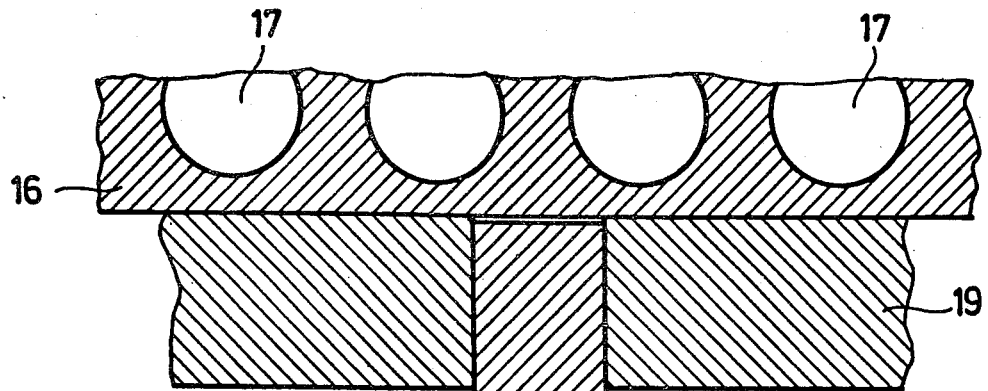
FIG. 2 is an enlarged cross sectional view of a portion of the apparatus shown in FIG. 1.

Referring now to FIG. 2, wherein like numerals designate like elements, it can be seen that each edge forming tool 20 protrudes to a considerable extent from the holding plate 19. The tool 20 is rule-shaped and has a rounded lower end which is the working edge of the tool. The radius of curvature of the rounded edge is approximately one-half the width of the tool 20. Variations, however, are possible.

At the beginning of each operation, the edge forming tool 20 is in the elevated position shown by the broken line 20a. After the thermoplastic sheet 22 is inserted into the proper position, the edge forming tool 20 is forced downwardly into the sheet 22 in the direction of the arrow and the high frequency generator 25 is turned on. As the temperature of the sheets 22 increases, the tool 20 is pressed into the surface of the sheet producing the cross section shown in FIG. 2. During this deformation process, the sheet portion on either side of the tool 20 lifts up by an amount "s". This produces a bend 30 on either side of the bottom of sheet 22. In addition, the upper surface of the sheet 22, adjacent the tool 20, embraces the sides of the working edge of the tool 20 as shown at 31. This results in well-rounded downwardly directed indentations which cannot be obtained by known methods wherein the forming tools are heated to a temperature above the melting temperature of the plastic.

The bending at points 30 results in bulges 30a on the lower part of sheet 22 opposite and parallel to the tool 20. The configuration of the fold line 30b can best be explained by the fact that the top and bottom surfaces of the sheet 22 maintain their consistency during the deformation process but the heat softened material within the sheet is forced sideways. Thus, the sheet 22 maintains its relative stiffness except at the fold line 30b. The fold line itself, however, is very "soft" or flexible thus allowing the sheet to be bent at angles between 0° and 180° without any significant spring back resilience and without the risk of breaking the sheet through multiple bending operations.

As stated above, an insulation plate 24 is positioned between the counter tool 23 and the sheet 22. This provides a bearing surface 32 for the sheet 22 and is required when the cutting device 21 is employed. If the cutting device 21 is eliminated, it is possible to operate the apparatus without the insulation plate 24. In this case, the upper metal surface of the counter tool 23 would act as a bearing surface 32'.

Figure 3:
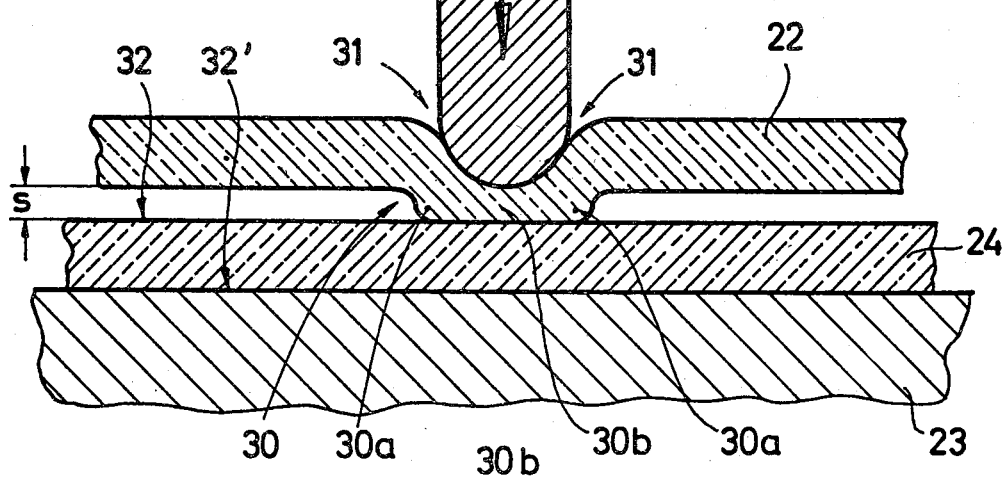
FIG. 3 is a cross sectional view of a thermoplastic sheet having a fold line formed therein and which is partially bent.

FIG. 3 illustrates a portion of a plastic sheet having a folding line formed therein and which sheet has been bent slightly. It should be noted that the sheet shown in FIG. 3 is inverted from the position shown in FIG. 2 such that the bulges 30a, for example, are on the upper surface of the sheet. The sheet is bent in the direction of the arrows shown around the fold line 30b in such a way that the groove 30c formed by the tool 20 is enlarged. The bulges 30a, however, remain clearly visible.

Figure 4:
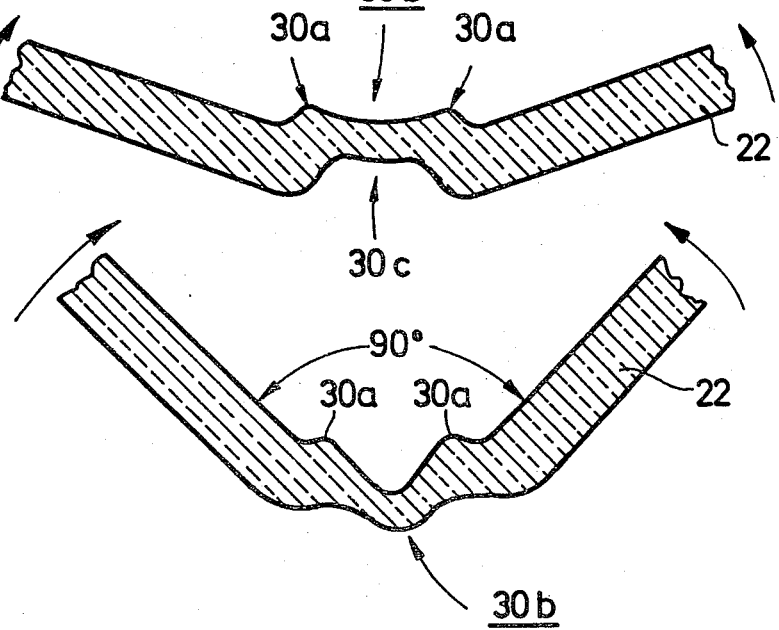
FIG. 4 is a view similar to FIG. 3 but showing the thermoplastic sheet in its final bent state.

FIG. 4 shows a plastic sheet in its final bent position and forming the corner of a finished box. The sides of the sheet 22 form a 90° angle with respect to each other and the groove 30c disappears almost entirely. Again, however, the bulges 30a remain clearly visible.

It is also possible to continue folding the sheet 22 to form a zero degree angle between the two sides. Because of this, prepared flat folded boxes can be assembled which have both zero degree angles and 180° angles. These folded boxes can then be set up or unfolded in conventional machines so that all of the corners have 90° angles.

EXAMPLE

An apparatus as shown in FIG. 1 was constructed and equipped with an edge forming tool including cutting devices so as to produce a completed box blank. The sheet employed was a highly transparent, plasticizer-free hard PVC material having a high impact resistance and a K-value of 60. The sheet material which was 0.250 mm thick was obtained from the Kloechner-Pentaplast GmbH Company, Montabaur. The sheet was then printed on and sealed.

The high frequency generator had a continuous output of 2500 W, a power of 5.5 kVA at full load and a frequency of 27.12 MHz. The edge forming tool was controlled in such a way that the tool penetrated the sheet by 0.175 mm, i.e. approximately 70%. The temperature of the edge forming tool was maintained at approximately 100° C. by the use of the coolant and the cooling plate. The surface impression was 5.0 kg/cm$^2$, the edge forming tool was 0.8 mm thick and the radius of the edge was 0.4 mm. The apparatus was operated at a cycle of 2.0 seconds; the high frequency heating being one second and the cooling one second.

The box blanks thus formed had perfectly bendable edges and could be processed without difficulty first to flat folded boxes and then to unfolded boxes which were packed and closed on cardboard machines at a rate of approximately 180 pieces per minute.

The present invention may be embodied in other specific forms without departing from the spirit or essential attributes thereof and, accordingly, reference should be made to the appended claims, rather than to the foregoing specification as indicating the scope of the invention.

I claim:

1. An apparatus for the production of container blanks by forming flexible fold lines in a thermoplastic sheet comprising a rule-shaped forming tool and a substantially flat surface for supporting said sheet, means for cooling said tool, means for moving said tool toward said substantially flat surface, means for electrically insulating said cooling means from said moving means, and means for creating a high frequency electric field between said tool and said substantially flat surface whereby the temperature applied to the surface of said sheet adjacent said tool is less than the temperature applied in the middle of said sheet in an area adjacent said tool.

2. An apparatus as claimed in claim 1 wherein said forming tool is mounted on a cooling plate and wherein said means for cooling cools said cooling plate.

3. An apparatus as claimed in claim 2 wherein said means for cooling include a plurality of cooling ducts in said cooling plate and a cooling fluid.

4. An apparatus as claimed in claim 1 wherein said rule-shaped forming tool has a rounded edge facing said substantially flat surface.

5. An apparatus as claimed in claim 1 further including cutting means, said means for moving also being adapted to move said cutting means toward said substantially flat surface.

* * * * *